United States Patent [19]

Milner

[11] Patent Number: 5,286,094
[45] Date of Patent: Feb. 15, 1994

[54] CONTROLLING BRAKING FORCES IN TRACTOR-TRAILER COMBINATIONS

[75] Inventor: Peter J. Milner, Warwickshire, England

[73] Assignee: Bloxwich Engineering Limited, United Kingdom

[21] Appl. No.: 915,734
[22] PCT Filed: Feb. 13, 1991
[86] PCT No.: PCT/GB91/00214
§ 371 Date: Jul. 27, 1992
§ 102(e) Date: Jul. 27, 1992
[87] PCT Pub. No.: WO91/12160
PCT Pub. Date: Aug. 22, 1991

[30] Foreign Application Priority Data

Feb. 16, 1990 [GB] United Kingdom ............... 9003568

[51] Int. Cl.$^5$ .................. B60T 7/20; B60T 13/66
[52] U.S. Cl. ........................... 303/7; 303/20; 303/22.1; 188/112 R
[58] Field of Search ........... 188/112 R, 112 A, 3 R; 303/7, 20, 8, 22.1; 324/662

[56] References Cited

U.S. PATENT DOCUMENTS

| | | | |
|---|---|---|---|
| 3,486,799 | 12/1969 | Greentree | 303/7 |
| 3,823,985 | 7/1974 | Hubbard | 303/7 |
| 3,955,652 | 5/1976 | Nilsson et al. | 303/7 X |
| 4,072,362 | 2/1978 | Van Anrooy | 303/7 |
| 4,196,936 | 4/1980 | Snyder | 303/20 |
| 4,763,958 | 8/1988 | Öhrgard | 188/112 R X |
| 4,961,055 | 10/1990 | Habib et al. | 324/662 |
| 5,029,947 | 7/1991 | Knight et al. | 303/7 |
| 5,141,292 | 8/1992 | Gardell et al. | 303/7 |

FOREIGN PATENT DOCUMENTS

| | | |
|---|---|---|
| 0037565 | 10/1981 | European Pat. Off. |
| 3133102 | 6/1982 | Fed. Rep. of Germany |
| 2164893 | 8/1973 | France |
| 1497179 | 1/1978 | United Kingdom |
| 8705571 | 9/1982 | World Int. Prop. O. |

Primary Examiner—Robert J. Oberleitner
Assistant Examiner—Peter M. Poon
Attorney, Agent, or Firm—Baker, Maxham, Jester & Meador

[57] ABSTRACT

A sensor in the drawbar (or fifth-wheel coupling) of a tractor-trailer road vehicle combination senses both push and pull force in a linear proportional manner and produces an electrical signal which is used to act on a continuously proportional solenoid valve in the fluid pressure supply to the trailer brakes to control the trailer braking continuously, during application, in a sense tending to reduce the force in the drawbar to zero. There may be a base pressure applied to the trailer brakes, modified positively or negatively by the pressure from the sensor signal.

8 Claims, 3 Drawing Sheets

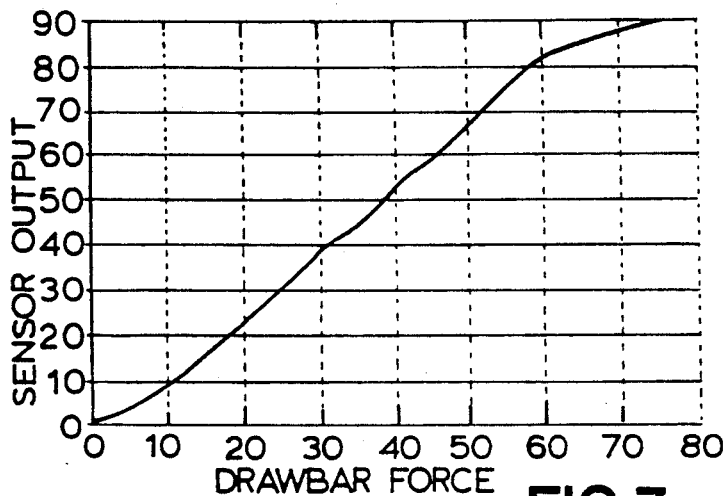
FIG.7
PRIOR ART
FIG.8
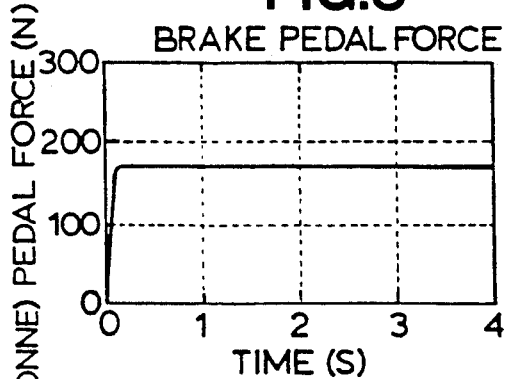
FIG.9
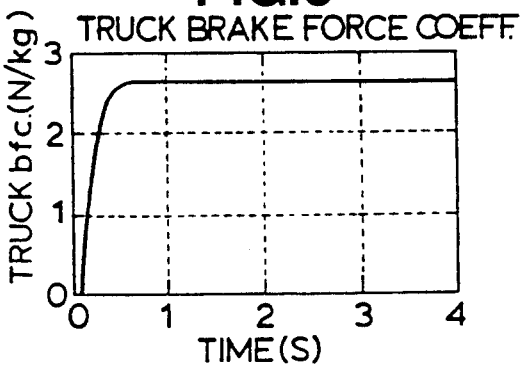
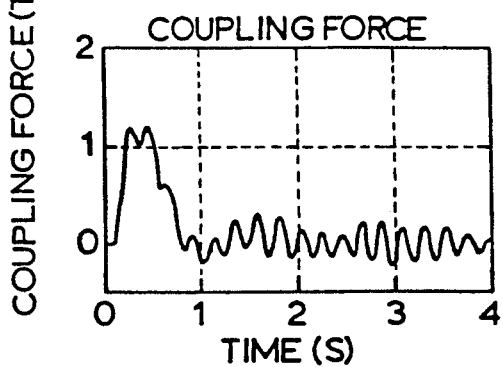
FIG.10
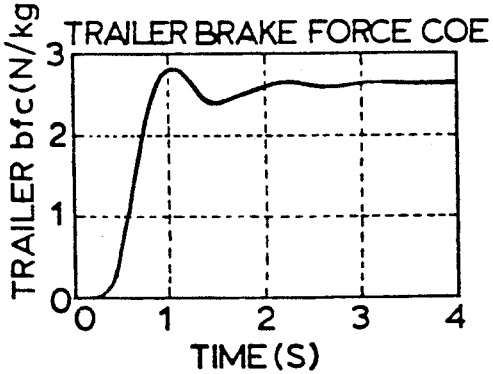
FIG.11

CONTROLLING BRAKING FORCES IN TRACTOR-TRAILER COMBINATIONS

This invention relates to the control of the braking forces in tractor-trailer combinations of road vehicles, either separate tractors and trailers joined by a drawbar, or vehicles with semi-trailers.

When the brakes are applied it is desirable that the braking forces should be such that trailer neither tries to overrun the tractor (indicating that it is not being braked enough) nor produces an additional drag load on the tractor (indicating that it is being braked too hard). The first situation can lead to jack-knifing and the second may lead to trailer swing. In both cases the minimum distance in which the combination can be brought to a halt is greater than it would be in the ideal condition, in which both are braked equally.

This ideal situation is difficult to achieve, bearing in mind that the weight of both vehicles, but especially of the trailer in the case of load-carrying vehicles, can vary widely between the unladen and fully laden conditions; a braking force appropriate to the fully laden condition would certainly cause the brakes to lock in the unladen vehicle.

Attempts have been made to solve this problem. It has been proposed, for example to adjust the braking force applied to the trailer, as a proportion of that applied to the tractor, manually in accordance with the known load being carried on the trailer at the time. Clearly this is impractical in normal commercial use and will soon fail to be implemented.

A better solution is that disclosed in British Patent Specification No. 497 179 of Daimler-Benz, in which, in an electric braking system, an electric signal dependent on the amount by which the trailer overruns the tractor is obtained from a linear potentiometer connected between relatively movable parts of the drawbar, and is used to control the application of the electric brakes on the trailer.

A somewhat similar solution, again applied primarily to electric brakes, is that disclosed in a U.S. Pat. No. 3,955,652 of A. B. Linde International, in which a pressure-sensitive transmitter in the coupling between the tractor and the trailer senses the pressure and pull on the coupling and controls an amplifier which is responsive to the magnitude and direction of the pressure and pull to control the supply of power to the brakes. The transmitter is stated to be actuated by very small movements, allowing the coupling unit to be substantially rigid. The system is operative to influence the brakes on the trailer every time the brake light circuit is closed by depression of the brake pedal.

A more recent proposal is that disclosed in U.S. Pat. No. 4,763,958 of VBG Produkter AB. However here the load on the trailer is sensed primarily not by the coupling but by a mechanical feeler arrangement driven by an electric motor through a lead screw and detecting the relative clearance between the chassis of the trailer and an axle, i.e., the static deflection of the road springs. Only secondary to this is an on-off sensing arrangement in the tractor-trailer coupling, employing two limit switches which detect when the push or pull in the coupling exceeds a predetermined amount and, when that happens, they complete an electric circuit to a motor which drives in one direction or the other an adjustable pressure-reducing valve in the compressed air supply to the brakes on the trailer.

Finally, in International (PCT) Patent Application No. W087/05571 of Saramo there is disclosed an arrangement in which the measurement of the force in the coupling is substantially linear in both directions, i.e. both in push and in pull, and the control equipment, indeed the whole apparatus is particularly suitable for mounting on the tractor vehicle, especially as a subsequent modification to an existing brake installation. The sensing is by means of an electrical resistance strain-gauge type of load cell, mounted in the coupling with substantial pre-loading to enable it to sense both positive and negative forces.

A major source of weakness in the known systems is the sensor. In our co-pending British patent application No. 9002433.2 filed on Feb. 3, 1990 we have put forward a novel form of capacitive transducer which overcomes most of the problems. However there are also further drawbacks in at least some of the known systems, mainly in the manner in which the signal is used to adjust the braking force in the trailer. It will be appreciated that the adjustment can only be introduced when the brakes are first applied on a given journey, this being the first occasion on which the sensor can provide a signal that is dependent on the relative braking between the tractor and the trailer. If the response time is too great or too small there is a danger of hunting or 'snatch'. In particular motor-operated regulating valves have too slow a response time to ensure smooth operation.

The aim of the invention is to achieve a further improvement in the control of trailer brakes in response to the load in the drawbar during braking, such as to achieve a smooth retardation of the vehicle combination with a minimum stopping distance, freedom from snatch or juddering, and a reduced risk of jackknifing or trailer swing.

According to one aspect of the invention a braking control system for the brakes of the trailer in a tractor-trailer combination comprising means sensing the push and pull in a drawbar or other connection between the tractor and trailer, the sensing means acting to control the pressure in a fluid pressure circuit supplying braking pressure from the tractor to the brakes on the trailer, distinguished by the features that the sensor produces an electrical signal which is substantially linearly proportional to both push and pull, this signal is used to control a continuously variable proportional solenoid valve in the circuit to the trailer brakes, and there is passed to the solenoid valve a base signal representative of a proportion of the main braking pressure applied in the tractor and the said first-mentioned signal is added algebraically to this base signal.

In order to achieve this we feed forward a signal representative of a proportion of the main braking pressure and pass this straight to the solenoid valve, leaving the signal from the drawbar to make up the difference, positive or negative, in order to give the required overall signal.

According to a further feature the electrical signal is modified to obtain both integral and derivative signals which are combined with the original signal in proportions which are preferably adjustable before being used to control the braking pressure.

An example of a trailer braking control system in accordance with the invention will now be described by way of example with reference to the accompanying drawings, in which:

FIG. 7 shows a typical sensor/output load characteristic;

FIG. 8 shows the brake pedal force behaviour of the system over time;

FIG. 9 shows the truck brake force coefficient behaviour of the system over time;

FIG. 10 shows the coupling force behaviour of the system over time; and

FIG. 11 shows the trailer brake force coefficient behaviour of the system over time.

Figure 1:
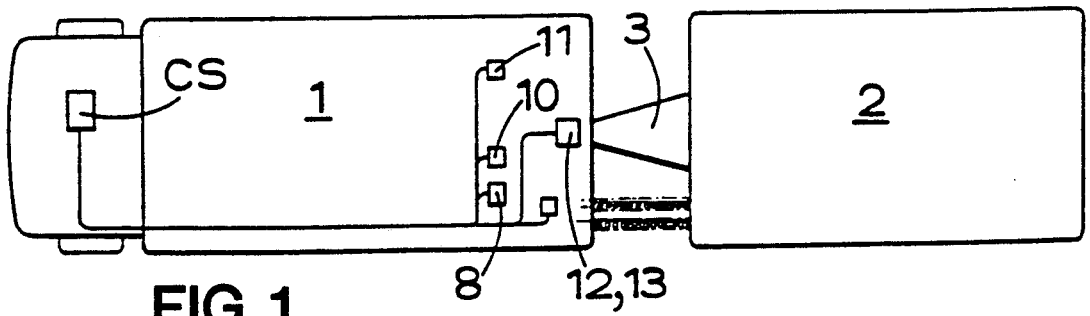
FIG. 1 is a diagrammatic plan view of the tractor trailer combination showing the electrical layout.
Figure 2:
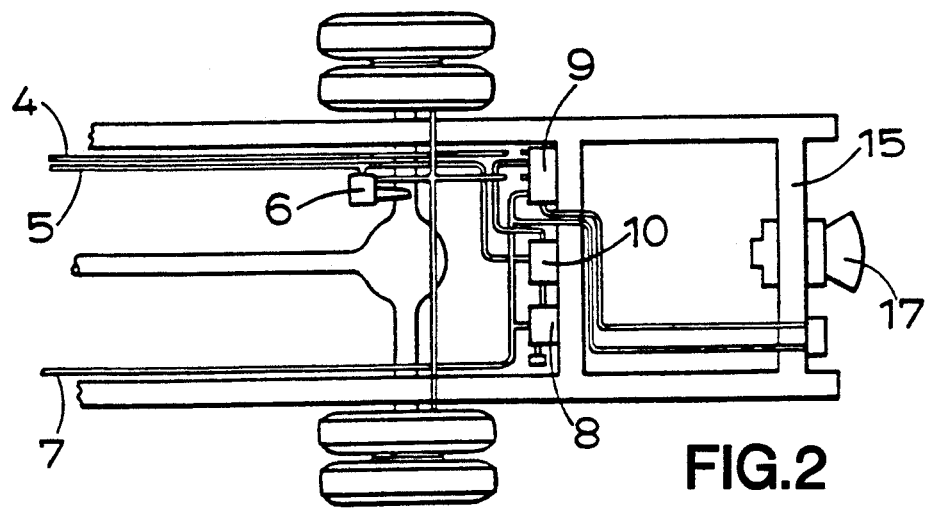
FIG. 2 shows in more detail the rear end of the tractor showing the pneumatic layout.

Referring first to FIGS. 1 and 2 a tractor vehicle in the form of a truck 1 has a compressed-air brake installation which is connected to the brakes of both that vehicle and those of a trailer 2 joined to the tractor by a drawbar 3. In the example illustrated there are separate circuits 4 and 5 (FIG. 2) to the front and rear axles of the tractor, with a known load-proportioning valve 6 in the circuit to the rear brakes. The main pressure line from the reservoir is shown at 7.

From the main reservoir pressure line 7, but ahead of the load-proportioning valve 6, we take a feed to a solenoid-operated proportional control valve 8 which produces a compressed air supply for the trailer brakes, via a trailer control valve 9, at a pressure proportional to the magnitude of the electric input signal to the solenoid. Such a olenoid-operated proportional control valve is commercially available under the mark Austin Beech from IMI Norgren Martonair.

As a fail-safe precaution we also provide an on/off solenoid-operated by-pass valve 10 to supply full braking pressure to the trailer brakes via the trailer control valve 9 in the event of any problems with the valve 8 or its associated circuits.

Also, for a reason which will become clear later, we provide a sensor 11 (FIG. 1) which senses the main brake pressure in the tractor vehicle.

Figure 3:
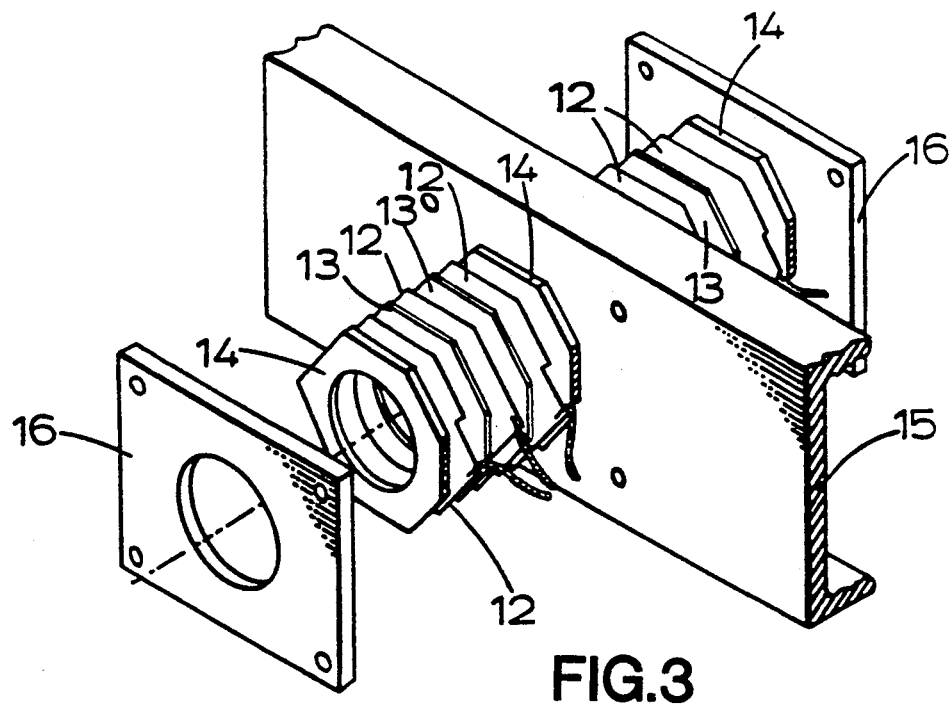
FIG. 3 is a exploded view of the transducer in the drawbeam assembly.

The primary signal for controlling the valve 8 is derived from a sensor in the form of a variable-capacitance transducer shown in exploded form in FIG. 3, and permanently mounted in the connection to which the drawbar of the trailer is releasably attached. This transducer is more fully described in our co-pending patent application filed on Feb. 3, 1990. It comprises a set of ring shaped electrodes 12 with rings of a dielectric material 13 sandwiched between them and clamped between insulating rings 14. There are such sets of electrodes on both sides of the drawbeam 15 at the rear end of the tractor and they are located between two flanges 16 rigidly or flexibly secured to the draw pin (which itself has been omitted from FIG. 3 for clarity). The draw pin lies on the axis shown in broken lines in the drawing and at its rear end has a standard ISO jaw 17 (FIG. 2) to receive the drawbar of the trailer.

The two flanges 16 are held by bolts (not shown) passing through holes in the drawbeam 15 and are spaced from it by disc springs of a known kind fitting over the bolts The disc springs are carefully selected and adjusted so that when there is no load the flanges are equidistant from the beam 15 and the capacitor plates are under equal amounts of compression, but as soon as a load, either a push or a pull, is applied to the pin through the drawbar one of the flanges will move closer to the beam 15 and the other will move away by an equal amount. The capacitor plates on one side will be squeezed together and those on the other side will move apart. By the right choice of disc springs it is possible for the displacement to be linear with load over a travel of 1 or 1.5 mm in each direction. Furthermore, by choosing springs of the appropriate rate it is possible to use exactly the same transducer for a wide range of sizes of trailer, from light trailers up to ones weighing over 20 tons.

Thus the transducer of the system according to the invention can be of a standardized construction. If a greater capacitance is required it is possible to use a greater number of electrodes than that shown. Moreover the drawbeam and drawpin assembly shown is of a known form, the spacing of the bolt holes being in accordance with an ISO standard, so it is a relatively easy matter to incorporate the transducer in an existing installation.

Figure 4:
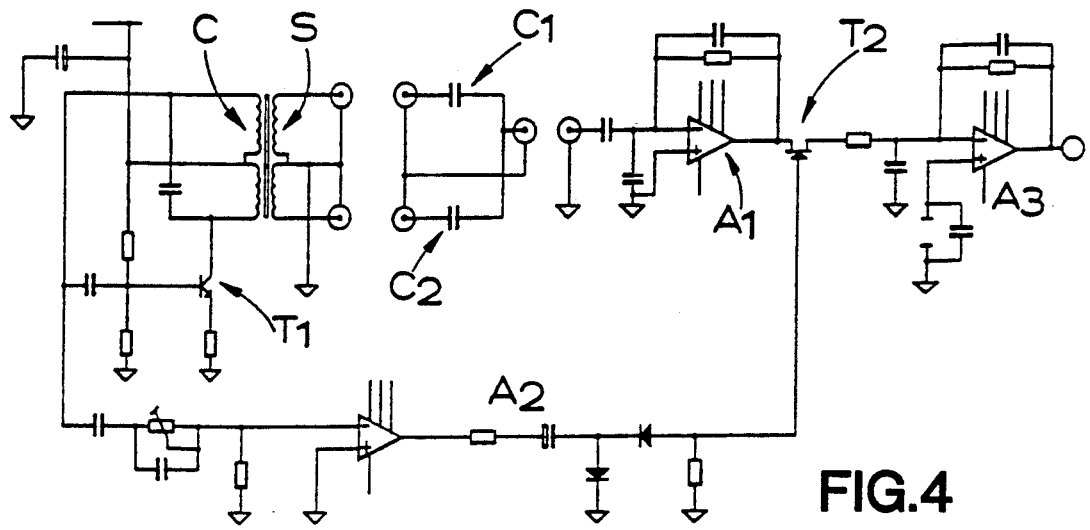
FIGS. 4, 5 and 6 are circuit diagrams showing how the signal from the sensor is handled.
Figure 5:
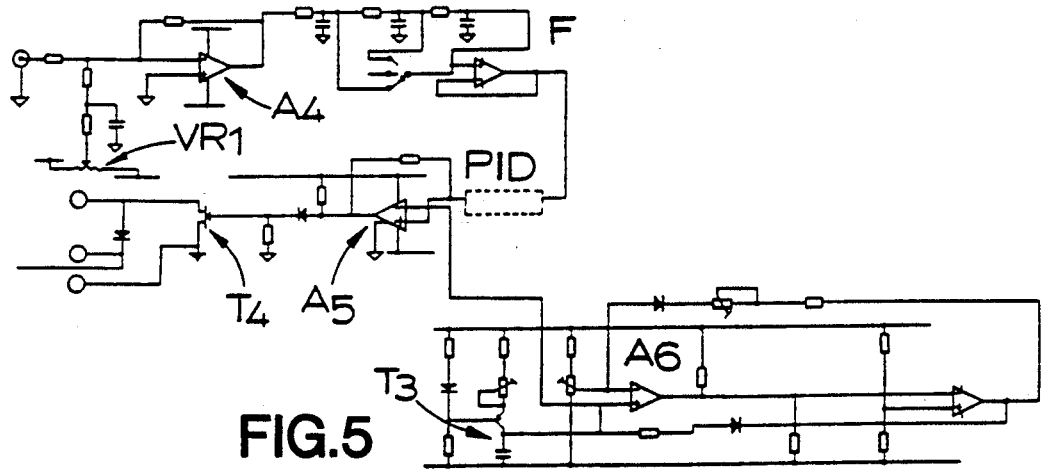
Figure 6:
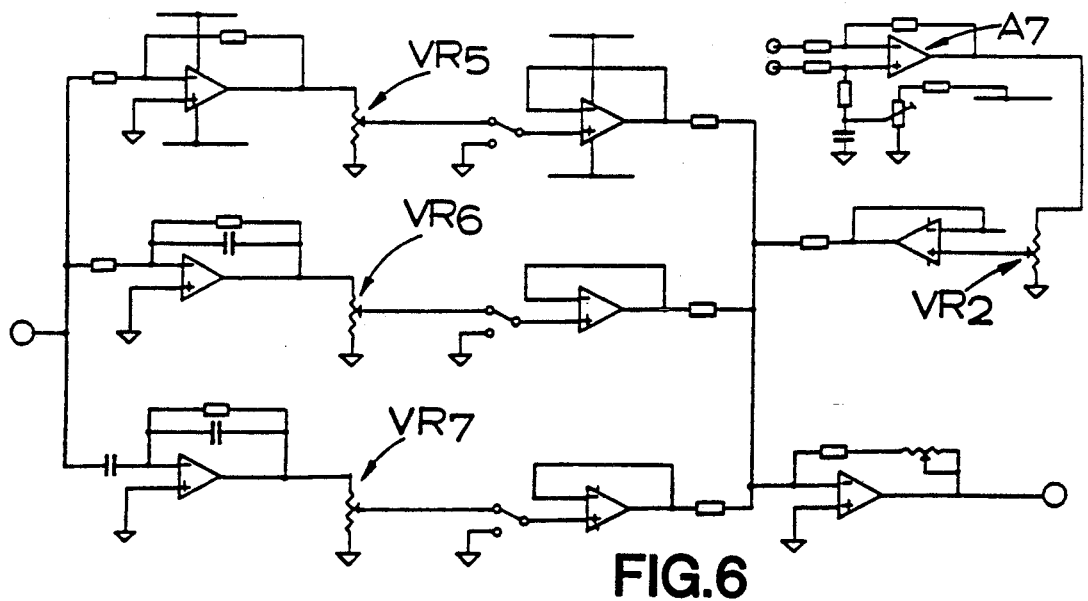

Referring to FIGS. 4, 5 and 6, the two capacitors that make up the transducer are shown in FIG. 4 at C1, C2, and form the two arms of a half bridge, each having a mean capacitance of about 470 pF. The two arms are driven with anti-phase sinusoidal voltages of approximately 1 volt peak-to-peak taken from a bifilar secondary winding S on the coil C of a free-running Hartley oscillator employing a transistor T1. The frequency of operation is not critical but in the example chosen it is 5 kHz.

The output signal from the bridge is AC-coupled into the virtual earth of an amplifier A1; this eliminates the effect of stray capacitances in the three-core cable which connects the transducer to the control system. Likewise stray capacitance to earth from any part of the sensor has no first-order effect A reference waveform is taken from the oscillator T1, phase-trimmed and squared at A2 and level-shifted to drive a series-chopper FET T2 in a phase-detector circuit fed with the signal from the amplifier A1. After two stages of filtering in amplifier A3 the bipolar signal varying over the range + or −5 volts passes to the circuit of FIG. 5. Here an offset, either positive or negative, can be applied through a variable resistor VR1 to cancel out any physical or pre-load asymmetry in the sensor before the signal is fed through a buffer amplifier A4 to an adjustable filter circuit F having a choice of three corner frequencies 10, 5 and 2.5 Hz, and thence through a PID(proportional integral differential) circuit to a comparator A5. The PID circuit is shown in detail in FIG. 6 and allows the derivation of integral and differential signals from the proportional signal, these three signals then being combined in proportions which are adjustable by means of potentiometers VR5, VR6 and VR7 Generally speaking, once the system has been set up, these will not need to be re-adjusted.

The resulting signal with integral and differential added components is compared in the amplifier A5 (FIG. 5) with a reference sawtooth, voltage generated in a circuit embodying transistor T3 and amplifier A6 to produce a pulse-width-modulated signal fed through an FET power switch T4 to control the 24 volt supply to the proportional solenoid air valve.

Pulse width modulation is preferred to a straight voltage signal as it reduces the risk of 'stiction' in the valve. It may also be advisable to remove the usual light spring that is provided in such valves to pre-load the spool into the closed position.

It will thus be seen that the braking pressure applied to the trailer when the main service brake in the tractor is actuated is made dependent on the force (positive or negative) in the drawbar. It is important to note that because of the placing of the proportional valve in the main brake supply pressure pipe (FIG. 2) it is possible for the pressure in the trailer brakes to be, where appropriate, actually higher than that in the tractor brakes.

By appropriate initial adjustment of the proportions of the integral and differential factors added into the main signal it is possible to obtain a smooth response which is continuously modifying the pressure in the trailer brakes in a sense to reduce the force in the drawbar to zero, as long as the brakes are being applied. This happens on each brake application, regardless of any intervening changes in the weight of the tractor or trailer. There is an inevitable slight delay in the response due to pneumatic circuit delays, so that the trailer brakes do not come into action instantaneously and the input signal caused by the change in drawbar load cannot start until they do so. However, the time constant is only of the order of 0.6 seconds.

FIG. 7 shows a typical sensor output drawbar force response curve. It is linear over the greater part of its length; non-linearity at the top end is due to the disc springs becoming solid, i.e. moving into the grossly non-linear part of their own load/displacement characteristics.

According to the invention, however, we may add on top of the sensor signal the base signal proportional to the main tractor brake pressure, i.e. a feed forward signal, and this is derived from the pressure/voltage transducer 11 (FIG. 2) in the tractor brake supply mentioned earlier. It is fed to an amplifier A7 in the three-term (PID) controller circuit of FIG. 6, balanced if necessary by an adjustable offset, and the proportion of it which is added is controlled by a variable resistor VR2.

In effect this allows the trailer brakes always to receive a proportion of the tractor brake pressure, the control system described above then being left to make up the difference (positive or negative) to the optimum level. This gives a certain added safety factor, but a further safety factor, in fact a 'fail-safe' provision, is provided by the solenoid-operated valve 10 (FIG. 2) designed to open and allow full tractor brake supply pressure to reach the trailer brakes in the event of any problem with the system described A typical result of normal operation of the system is shown in FIGS. 8 to 11, which illustrate the responses of various aspects of the system. It will be seen that on the sudden application of a given braking force to the brake pedal in the tractor vehicle the brake force in the tractor follows almost in step and, after rising for a brief moment, the force in the coupling between tractor and trailer is reduced to zero within about 0.6 seconds and then oscillates about the zero level during continued brake application. It will be seen that the braking force applied to the trailer reaches a steady state at the appropriate level with barely a half-cycle of oscillation.

Finally, turning back to FIG. 1, and 2 and 3 it will be appreciated that all the components of the system described are mounted on the tractor, and so a given tractor to which the system is fitted can be used with any existing trailer, of any weight within a given range, the trailer requiring no modification. Moreover the system can be fitted to existing tractors by adding the appropriate sensor in the ISO drawbeam/hitch connection and mounting the necessary valves in the air supply. The electronic control system may be mounted in the cab of the vehicle, out of harm's way, as indicated at CS in FIG. 1 but better still close to the valves at the rear of the vehicle.

I claim:

1. A braking control system for a number of brakes of a trailer in a tractor-trailer combination comprising sensing means for sensing a push and a pull in a drawbar or other connection between the tractor and trailer, the sensing means acting to control a pressure in a fluid pressure circuit supplying a braking pressure from the tractor to the brakes on the trailer, distinguished by the features that the sensing means produces a first electrical signal which is substantially linearly proportional to both the push and the pull in the drawbar, said first signal is used to control a continuously variable proportional solenoid valve in a circuit to the trailer brakes, and there is passed to the solenoid valve a base signal representative of a proportion of a main braking pressure applied to the tractor and said first signal is added algebraically to this base signal and the sensing means is a variable capacitance transducer comprising two capacitors connected to two arms of a bridge circuit and arranged so that a change in a load between the tractor and trailer causes an increase in a value of one and a decrease in the value of another, said first signal being an alternating current bipolar signal obtained by phase detection of an alternating current applied to the bridge circuit.

2. A braking control system according to claim 1 in which the first electrical signal is modified by the addition to it of both integral and derivative signals.

3. A braking control system according to claim 2 in which provision is made for adjusting a proportion of each of the integral and derivative signals added to the first signal.

4. A braking control system according to claim 1 including means for feeding into the first signal an offset signal to correct any physical or pre-load asymmetry.

5. A braking control system according to claim 1 in which the first signal, in combination with the base signal, is applied to the solenoid valve as a pulse-width-modulated signal.

6. A braking control system according to claim 1 in which the first signal, in combination with the offset and the base signal, is applied to the solenoid valve as a pulse-width-modulated signal.

7. A braking control system according to claim 1 in which the first signal, in combination with the base signal, is applied to the solenoid valve as a pulse-width-modulated signal.

8. A braking control system according to claim 1 in which the first signal, in combination with the base signal, is applied to the solenoid valve as a pulse-width-modulated signal.

* * * * *